Figure 1:
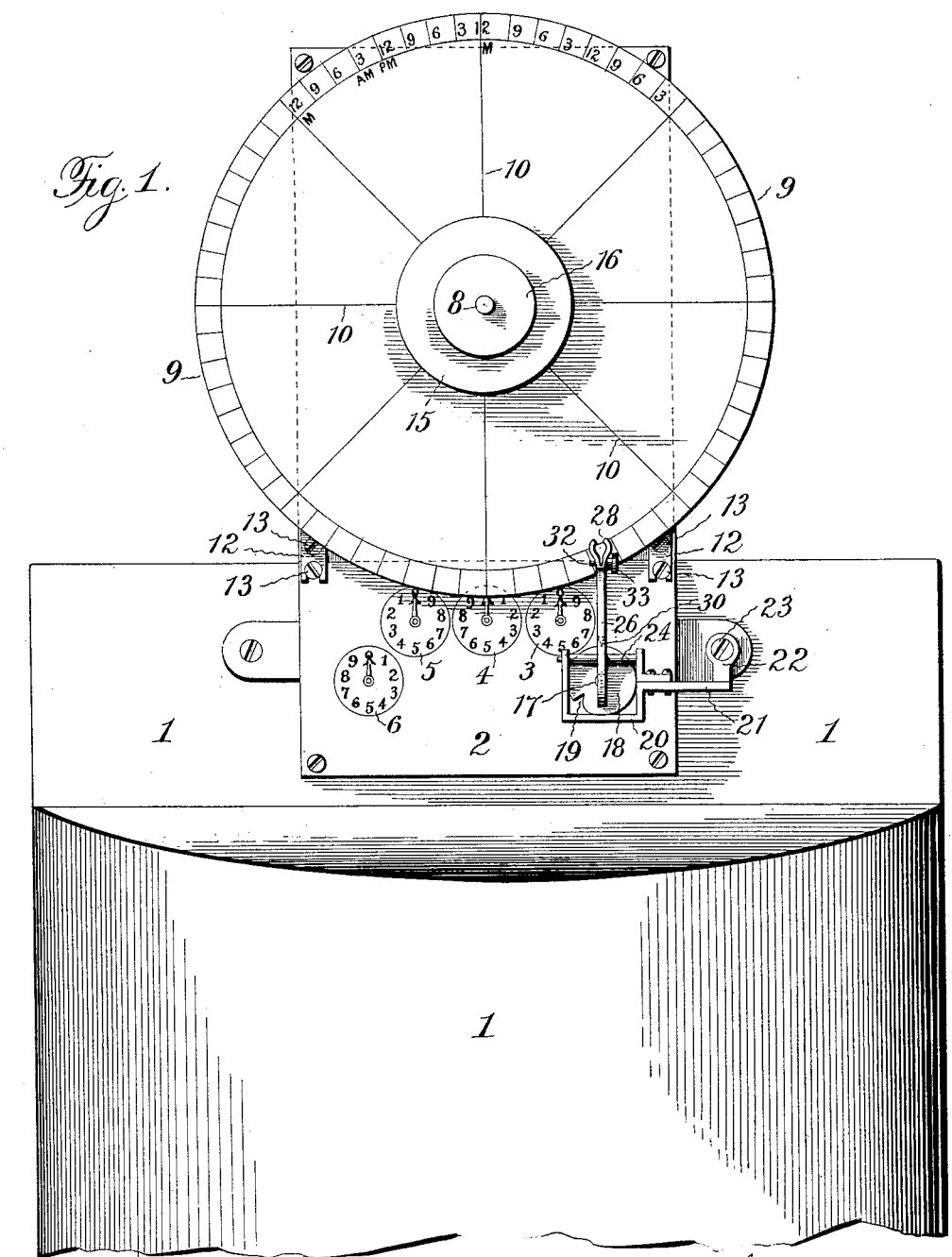

No. 635,594. Patented Oct. 24, 1899.
L. C. REED.
RECORDING MECHANISM FOR FLUID MEASURING METERS.
(Application filed Oct. 6, 1898.)
(No Model.) 2 Sheets—Sheet 1.

Witnesses:
Jas. E. Hutchinson.
Albert H. Norris.

Inventor.
Lyman C. Reed,
By James L. Norris.
Attorney.

No. 635,594. Patented Oct. 24, 1899.
L. C. REED.
RECORDING MECHANISM FOR FLUID MEASURING METERS.
(Application filed Oct. 6, 1898.)
(No Model.) 2 Sheets—Sheet 2.

Witnesses:
Jas. E. Hutchinson.
Albert H. Norris.

Inventor.
Lyman C. Reed,
By James L. Norris.
Attorney.

UNITED STATES PATENT OFFICE.

LYMAN C. REED, OF NEW ORLEANS, LOUISIANA, ASSIGNOR TO WARREN B. REED, OF SAME PLACE.

RECORDING MECHANISM FOR FLUID-MEASURING METERS.

SPECIFICATION forming part of Letters Patent No. 635,594, dated October 24, 1899.

Application filed October 6, 1898. Serial No. 692,831. (No model.)

*To all whom it may concern:*

Be it known that I, LYMAN C. REED, a citizen of the United States, residing at New Orleans, parish of Orleans, and State of Louisiana, have invented new and useful Improvements in Recording Mechanism for Fluid-Measuring Meters, of which the following is a specification.

The chief object of my invention is to provide novel means which will show, through the medium of recording mechanism, differences in the load of any measuring and recording meter with regard to the time in which a certain quantity of fluid has been registered, for the purpose of visibly indicating if the given quantity has been registered uniformly or variably, and if variably the hours or between what hours the variation occurred. For example, if a certain electric meter registered five thousand (5,000) watt hours in twenty-four hours it is desirable to know whether this quantity has been registered at a uniform or a variable rate, and if variable between what hours the variation in load consumed occurred. If three thousand (3,000) watt hours have been registered between one and three o'clock p. m. and two thousand (2,000) watt hours during the remainder of the twenty-four hours, the information is desirable and important for determining the basis of charges for the quantity of current or fluid consumed, such as the unit of electrical activity or power supplied by electric plants.

The invention also has for its object to provide new and improved attachments for wattmeters which measure and record the watt hours or units of power passing at certain hours or given times in a circuit or through the meter, the construction, arrangement, and mode of operation being such that I am able to present to electric, water, and gas companies an apparatus for the purposes stated which is simple, economical, durable, and effective, and will clearly show to the eye the varying number of watts or units of power or quantity passing through the day and night or at any time during a certain number of hours.

These objects are accomplished in the manner and by the means hereinafter described and claimed, reference being made to the accompanying drawings, in which—

Figure 3:
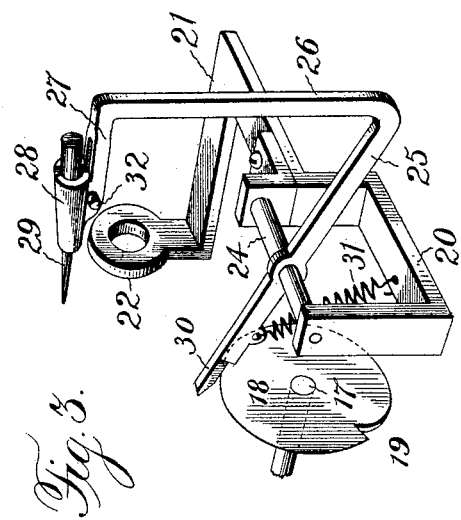
Figure 2:
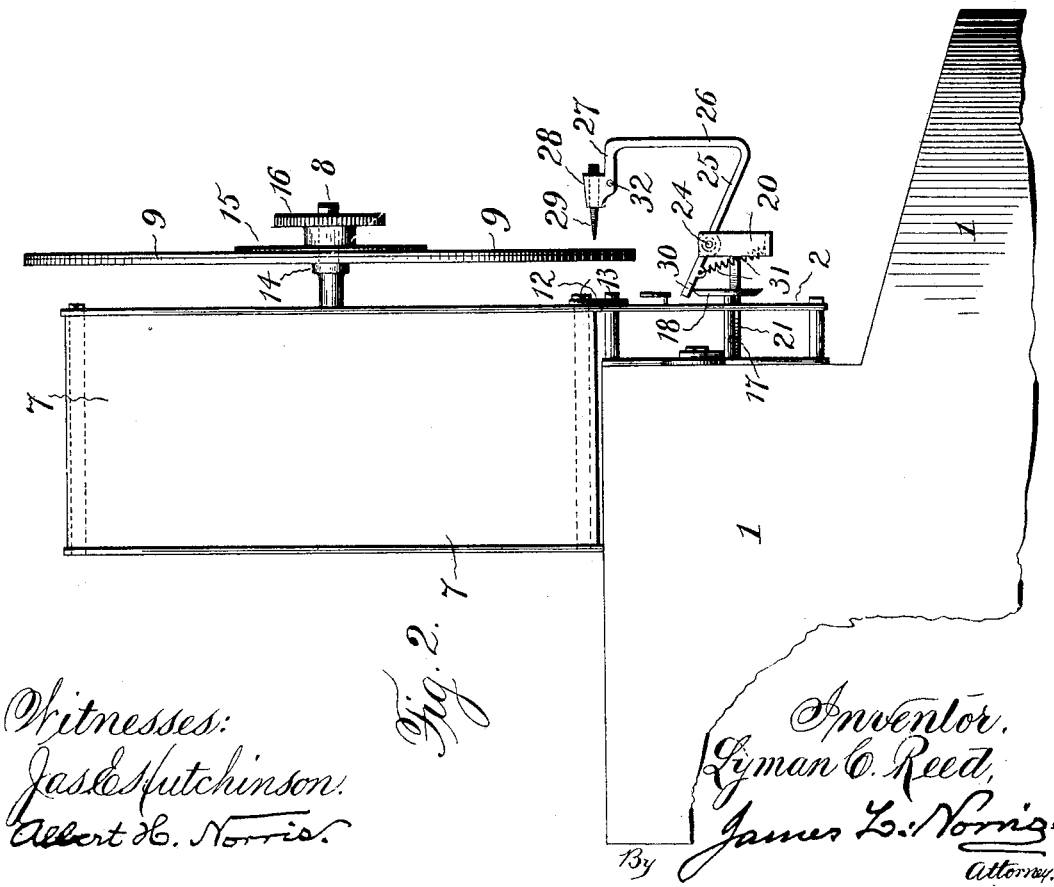

Figure 1 is a broken front elevation of a wattmeter with my invention in operative connection therewith. Fig. 2 is a broken side elevation of the same; and Fig. 3 is a detail perspective view of the rocking carrier on which the marker, pencil, or stylus is mounted, showing also the detachable bracket or frame for supporting the carrier and the rotary cam disk or wheel which serves to actuate the said carrier at certain intervals.

In order to enable those skilled in the art to make and use my invention, I will now describe the same in detail, referring to the drawings, wherein—

The numeral 1 indicates a Thomson-Houston wattmeter; 2, the dial-frame in which the index or pointer-operating mechanism is arranged, as usual, and 3, 4, 5, and 6 the dials of the meter over which the usual index hands or pointers travel, as is well known, to register the quantity of fluid or the units of electrical activity or power flowing through the meter. The top portion of the meter is surmounted by or supports a clock-case 7, containing any ordinary or suitable clock-movement, and a center arbor 8, on which is mounted a chart or dial 9, preferably made in the form of a disk, having its face laid off or subdivided into eight day-divisions by radial lines 10, each designed to indicate twenty-four hours by providing it, near the periphery of the dial, with short radial lines and characters, figures, or conventional signs showing the hours. As herein illustrated, the margin of the chart or dial is provided with figures which indicate time as follows: 12 m., 3, 6, 9, and 12 o'clock p. m., and 3, 6, and 9 a. m. The figures or signs indicating 12 m. are preferably placed on the outer end portions of the long radial lines which subdivide the chart or dial into the eight day-divisions referred to.

The clock may contain a one-day or an eight-day movement, and preferably the clock-case is connected with the meter-dial by means of metal or other suitable straps 12 and screws 13 passing through the straps into the clock-case and the front of the meter-dial frame. The chart or dial 9 is detachably secured against a shoulder 14 on the center arbor 8 of the clock-movement through the medium of a washer 15 and thumb-screw 16, which is screwed upon the threaded outer end of the arbor, whereby it is possible to conveniently and quickly substitute a new dial for one that has been used.

The shaft 17, which usually carries the index or pointer for the initial or primary dial, (not shown,) is extended from the front of the dial-plate 2 of the meter a sufficient distance to carry a disk-shaped cam or wheel 18, the cam portion of which is in the form of a peripheral notch or recess having a cam-shaped or rounded edge 19. In front of the cam disk or wheel is arranged a removable and replaceable yoke-shaped bracket or frame 20, having an arm 21, provided with an eye 22, through which is passed a screw 23, which serves to also attach a part of the dial-frame of the meter to the upper part of the meter-casing. The bracket or frame 20 may be of any form or shape, and it may be detachably supported in any manner suitable for the purpose in hand, for which reason I do not wish to be understood as confining myself to the exact yoke shape of the frame 20 shown nor to the provision of the particular arm 21 and eye 22 for securing the frame in position in front of the cam disk or wheel. The bracket or frame 20 is provided with a comparatively small horizontal shaft or spindle 24, at the center of which is mounted an oscillatory pencil or stylus or carrier composed of a lower inclined arm or member 25, an approximately vertical arm or member 26, and an approximately horizontal arm or member 27, projecting toward the chart or dial and provided with a clamp or socket 28 for securely holding a marker, pencil, or stylus 29. The lower arm or member 25 is mounted between its front and rear end portions on the shaft or spindle 24 in such manner as to provide this arm or member with a tailpiece 30, extending toward the chart or dial directly above or over the periphery of the cam disk or wheel 18. The tail end 30 is drawn downward through the medium of any suitable spring 31 for the purpose of holding such tail end in contact with the periphery of the cam disk or wheel and cause it to spring into the notch or recess in the periphery of the cam-disk when the notch or recess coincides or registers with the tail end of the stylus or pencil carrier, thereby swinging the carrier and causing the stylus or pencil 29 to move toward and bear against the dial to mark the same at a point thereupon which bears a character, figure, or sign indicating or representing a certain hour or at a point between the short radial lines, as will be obvious. The tail end 30 of the carrier, which bears against the periphery of the cam disk or wheel 18, is brought to a knife-edge to reduce friction, and friction is also reduced by beveling the edge of the cam-disk and making one edge of the notch or recess 19 curved or rounded.

The stylus or pencil holder may be of any desired or suitable construction; but as here shown it is made in the form of two clamping or gripping jaws, which can be clamped upon the marker, pencil, or stylus through the medium of a clamping-screw 32 having a thumb-piece 33.

The chart or dial 9 is rotated by the clock-movement, and at every complete revolution of the cam wheel or disk 18 a mark is made upon the chart by the marker, pencil, or stylus 29, whereby a record of the number of revolutions of the primary or initial dial of the meter is obtained, as well as the variation in speed or revolution of the cam disk or wheel for a certain period—say eight days—while at the same time the hours or times between which the variation occurred are indicated by the marks made on the chart or dial by the marker, pencil, or stylus.

By the means described I provide an apparatus or mechanism which practically breaks or divides the total consumption registered by the meter into units of the desired value not greater than that registered by one revolution of the cam disk or wheel—that is to say, into certain divisions which are marked upon the dial or chart 9 hour by hour. The chart or dial 9, continuously rotated by the clock-movement, in connection with the marker, pencil, or stylus, records these units during the hours in which they are consumed and gives not only the time during which they were consumed, but also the time required to register each unit.

The disk-shaped cam or wheel 18 takes the place of the index or pointer for the initial or primary dial, the notch 19 serving the purpose of an index or pointer. There may be more than one notch in the periphery of the disk or wheel, the notches or recesses representing any desired units, the distance between the dots or marks on the chart or dial 9 indicating the units into which the cam is divided.

Although I have illustrated my invention in connection with a wattmeter, I do not wish to be understood as limiting myself thereto, as my invention may be operatively connected with any meter which registers the quantity of fluid flowing therethrough.

In practice the rotary dial or chart may be inclosed within a suitable case to prevent access thereto except by an authorized person.

Having thus described my invention, what I claim is—

1. The combination of a fluid-meter having registering mechanism for registering the units of power, a notched disk or wheel forming a part of said registering mechanism, a movable chart bearing characters representing time, and a pivoted spring-pressed stylus-carrier having a tailpiece to spring into the notched part of the disk or wheel and a stylus which marks the chart at recurring intervals to indicate if the fluid whose units of power have been registered by the meter registering mechanism flowed through said meter uniformly or variably and between what times any variation occurred, substantially as described.

2. The combination of a fluid-registering meter having a registering mechanism for registering the units of power, a notched disk or wheel carried by the initial or primary shaft of the registering mechanism, a movable chart bearing characters representing time, and a spring-pressed stylus-carrier having a tailpiece to spring into the notched part of the disk or wheel and a stylus which marks the chart at recurring intervals to indicate if the fluid whose units of power have been registered by the meter registering mechanism flowed through said meter uniformly or variably and between what times any variation occurred, substantially as described.

3. The combination of a fluid-registering meter having a registering mechanism for registering the units of power, a notched disk or wheel carried by the initial or primary shaft of the registering mechanism, a movable chart bearing characters representing time, a bracket or frame attached to a part of the meter-case and having a shaft or spindle, and a spring-pressed stylus-carrier mounted on the shaft or spindle and having a tailpiece to spring into the notched part of the disk or wheel and a stylus which marks the chart at recurring intervals to indicate if the fluid whose units of power are registered by the meter registering mechanism flowed through said meter uniformly or variably and between what times any variation occurred, substantially as described.

4. The combination with a fluid-meter having registering mechanism for registering the units of power, of mechanism for indicating if the fluid whose units of power have been registered flowed through the meter uniformly or variably, said indicating mechanism consisting of a notched disk or wheel forming a part of the meter registering mechanism, a movable chart bearing characters representing time, a bracket secured to the exterior of a part of the meter-case, a shaft or spindle carried by said bracket, and a rocking, spring-pressed stylus-carrier mounted on said shaft or spindle and provided with a stylus and with a tailpiece to spring into the notched part of the disk or wheel, substantially as described.

In testimony whereof I have hereunto set my hand in presence of two subscribing witnesses.

LYMAN C. REED.

Witnesses:
FRANK FARRELL,
J. THOMAS WHITE.